(12) United States Patent
Tillotson

(10) Patent No.: US 7,687,025 B2
(45) Date of Patent: Mar. 30, 2010

(54) ISOTOPIC LIGHTENING

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 1282 days.

(21) Appl. No.: 10/988,055

(22) Filed: Nov. 12, 2004

(65) Prior Publication Data

US 2006/0102464 A1 May 18, 2006

(51) Int. Cl.
*C22C 43/00* (2006.01)

(52) U.S. Cl. .................. 420/1; 420/7; 423/249

(58) Field of Classification Search .......... 420/1, 420/7; 423/249; 204/157.21
See application file for complete search history.

(56) References Cited

U.S. PATENT DOCUMENTS

| 2,951,801 | A | * | 9/1960 | Lillie | 420/1 |
| 3,420,640 | A | * | 1/1969 | Porter | 423/251 |
| 4,042,670 | A | * | 8/1977 | Kruger | 423/251 |
| 5,296,207 | A | * | 3/1994 | Lux | 423/446 |

OTHER PUBLICATIONS

Uranium Enrichment article; Nov. 1997; 20 pages; Urenco.
EaglePicher Technologies, Boron article; web page; Aug. 23, 2004; 2 pages; www.epcorp.com/EaglePicherInternet/Technologies/Boron.
The Majorana Zero Neutrino Double-Beta Decay Experiment; pp. 78-84; undated.
Rosman, K.J.R., Table of Isotopic Masses and Natural Abundances; undated; 5 pages.
Outstanding Performance Award internet printout; Boeing High Energy Systems; Feb. 24, 2005; 4 pages; Boeing.
Space Shuttle Solid Rocket Booster; web article; Sep. 30, 2004; 9 pages; www.encyclopedia.thefreedictionary.com.
Donahue and Tillotson; Mars Ascent Concept Using NTR With Lithium Propellant; 1998; 9 pages; The Boeing Company, Boeing Information, Space & Defense Systems, Huntsville, AL.
Xenon Ion Propulsion; Internet fact sheet; undated; 4 pages; Boeing Satellite Systems, Inc., Los Angeles, CA.
Boeing 702 Fleet; Internet fact sheet; undated; 6 pages; Boeing Satellite Systems, Inc.; Los Angeles, CA.

* cited by examiner

*Primary Examiner*—Roy King
*Assistant Examiner*—Ngoclan T Mai
(74) *Attorney, Agent, or Firm*—Harness, Dickey & Pierce, P.L.C.

(57) ABSTRACT

A method of manufacturing a component. In a preferred embodiment, the method includes enriching an element with an isotope and using the enriched element as a material of the component. A property of the first isotope being the same as a property of a second isotope and is preferably a mechanical, chemical, or electrical property. A second element can also be used as a material of the component, for instance, where the material is an alloy or a composite material. Further, the first isotope can be a lighter isotope of the element. Lightweight components may be manufactured using the method such that mobile platforms (e.g. spacecraft) can be assembled from the component(s). In other exemplary embodiments, the element can be hydrogen, lithium, boron, magnesium, titanium, or iron. Additionally, the component may carry a load. Components including isotopically enriched elements are also provided.

16 Claims, 2 Drawing Sheets

ISOTOPIC LIGHTENING

FIELD OF THE INVENTION

This invention relates generally to a method of manufacturing components and, more particularly, to the manufacturing of components for which low mass along with relatively superior mechanical, chemical, or electrical properties are desired.

BACKGROUND OF THE INVENTION

An enduring problem in spacecraft design is to minimize the "dry weight" of the spacecraft, i.e. the mass of components excluding propellant. This problem arises because every extra kilogram (kg) of mass in the spacecraft means less mass allocation available for the payload. Given that the cost of delivering payloads to space is high (from about $10K/kg for bulk deliveries to low Earth orbit to upwards of $1 million/kg for hardware soft-landed on Mars) there is a powerful incentive to reduce the mass of payloads, the launch vehicle, the spacecraft, and the constituent components of these devices.

A common way to address this challenge is through new materials. Alloys or composites that offer high strength, or stiffness, with low density are used when they are available and cost-effective. However, such materials are often difficult and costly to develop. They must satisfy the primary characteristics, such as strength or electrical conductivity, and important secondary characteristics such as resistance to the space environment, electrochemical compatibility with other materials, and manufacturability. Once they are developed, they must be "qualified" (i.e. certified through testing and demonstration) which is itself a costly process.

Thus, a need exists for materials that are similar to existing qualified materials in every way, except that they have a different density.

SUMMARY OF THE INVENTION

The present invention provides methods of producing lighter weight materials using isotopic enrichment of the material to reduce its density without altering the mechanical, chemical, or electrical properties. The present invention also provides lighter materials and articles of manufacture made from the lighter materials.

In a first preferred embodiment, the present invention provides a method of using isotopically enriched materials for spacecraft components, where the materials are enriched in lighter isotopes and depleted in heavier isotopes. This enrichment yields a material that is less dense but has otherwise similar properties such as chemical compatibility, electrical conductivity, and mechanical strength as the un-enriched material. As a result, the specific strength of these lightened materials is improved. These materials may be used as feedstock for the fabrication of components in which a high strength-to-weight ratio is preferred. For instance, rotating machinery components can be fabricated from the enriched materials. Because of the reduced mass of the rotating components the resulting machine is capable of accelerating and decelerating more sharply than machines of the same design that were fabricated from materials with naturally occurring isotopic abundances.

In a second preferred embodiment, a method of manufacturing a component is provided. The method includes enriching an element with an isotope and using the enriched element as a material of the component. Even though the element is enriched a property (preferably a mechanical, chemical, or electrical property) of the first isotope is the same as a property of the second isotope. A second element can also be used as a material of the component (e.g. the material is an alloy or composite material). Further, the isotope can be one of the lighter isotopes of the element. Of course, lightweight components may be manufactured using the method such that mobile platforms (e.g. spacecraft) can be assembled from the component(s). In other exemplary embodiments, the element can be, but is not limited to, hydrogen, lithium, boron, magnesium, titanium, or iron. Additionally, the component may carry a mechanical load.

In a third preferred embodiment, the present invention provides an article of manufacture that includes a portion of an element, a first isotope of the element, and a second isotope of the element. The first isotope of the element has a property that is the same as a property of the second isotope. The isotopes each have a natural abundance but the portion of the element is enriched with the first isotope. In another preferred embodiment, the enriched portion of the element is alloyed with a second element to form, for example, an aluminum-lithium alloy. Further, the first isotopes may be radioactively stable (or unstable) and can be lighter than the second isotope. Of course, the article may be part of a spacecraft. In some preferred embodiments, the element is one or more of hydrogen, lithium, boron, magnesium, titanium, or iron. In yet another preferred embodiment the "enriched" element maybe obtained from the depleted tailings of an enrichment process wherein the product is enriched in the second isotope, rather than the first isotope. In other words, the enriched process is intended to enrich the element with the second isotope, the depleted tailings (that are enriched in the first isotope) being a byproduct of the enrichment process rather than the intended product.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate embodiments of the present invention and together with the description, serve to explain the principles of the invention. In the drawings.

DETAILED DESCRIPTION OF THE PREFERRED EMBODIMENTS

Figure 1:
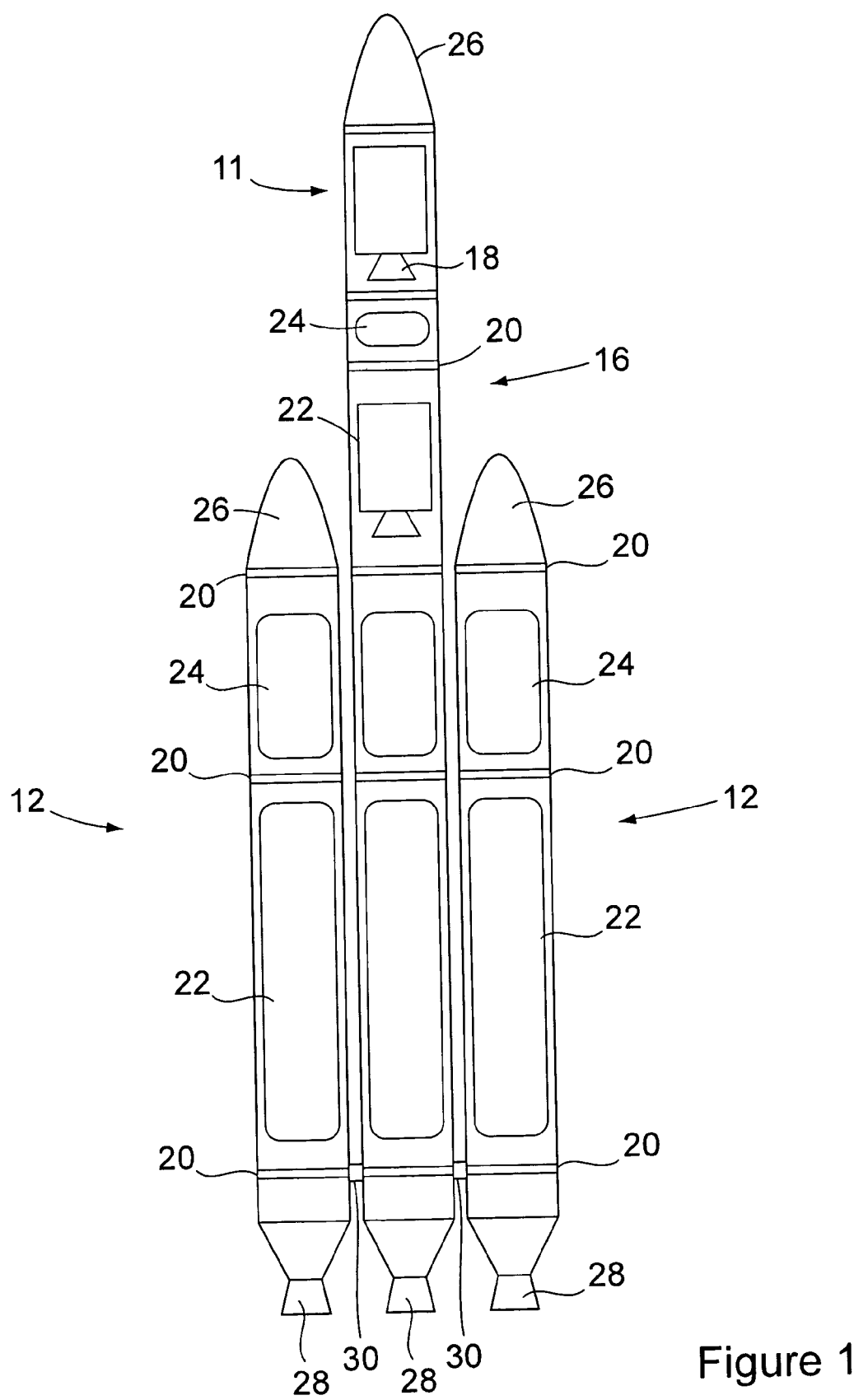
FIG. 1 illustrates a structure constructed in accordance with a preferred embodiment of the present invention.

Referring to the accompanying drawings in which like reference numbers indicate like elements, FIG. 1 illustrates a launch vehicle constructed in accordance with a preferred embodiment of the present invention.

The launch vehicle 10 includes a wide variety of structures and other components that are typically designed to be as light as possible while also being designed to maximize the mechanical properties of the components. Because these components experience a variety of chemical environments, the design of the components also takes into account the chemical properties of the materials selected for the components. Such components are deemed to be "light weight" components in that they possess lower mass (i.e. weight in a gravitational field) than other components with similar performance requirements. For instance, because a strut on a launch vehicle must be lighter than a strut carrying the same load on a barge, the launch vehicle strut will typically be designed as a lightweight component.

Also, because the payloads carried by the launch vehicle are quite valuable, the components and the launch vehicle itself usually undergo an exhaustive testing or certification process that is known as "qualification." Any change in the design of an individual component (including the choice of the materials from which it is made) may make the re-qualification of that component alone, or in combination with other components, desirable. Sometimes it is possible to re-qualify the modified component via additional analysis to prove that the modified component will satisfy its performance requirements (e.g. capability to carry a given load or resist a hostile chemical environment). The degree of rigor required to protect the payload makes even re-qualification by analysis an expensive and time consuming process.

Typical, non-limiting examples of components of the integrated launch vehicle (i.e. the launch vehicle 10 and the payload 11) include a lower stage 12, an intermediate stage 14, an upper stage 16, and the payload itself 11. Structural components also include stringers, ribs, beams, and the like 20, fuel tanks 22, oxidizer tanks 24, aerodynamic structures such as fairings 26, engines 28, and connecting struts 30.

Of course, the components are made from a variety of engineering materials as demonstrated by the exemplary launch vehicle 10 of FIG. 1. Some components are made from complex alloys while other components are elemental metals. Yet other materials used to create the components include composite materials, polymers, compounds, and elements other than metallic elements. The variety of materials, like the variety of components, arises from the mission requirements of the launch vehicle 10 and are also too numerous to recite.

Each of these chemical elements is defined by the number of protons in the nucleus of an atom of that element. Thus, all atoms of a given element have the same number of protons, although most elements have several isotopes. These isotopes differ from each other in that the number of neutrons in the nucleus for each isotope is different. Hydrogen, for example, has two stable isotopes. Both isotopes have one proton per nucleus. The more common hydrogen isotope has no neutrons and the less common isotope, deuterium, has one neutron. About 0.015% of hydrogen atoms on Earth are deuterium. Isotopes are normally identified by their atomic weight, which is the sum of the number of protons and neutrons. The atomic weight is written as a superscript next to the chemical symbol for the element. Thus the more common hydrogen isotope is referred to as $^1H$ and the more rare isotope (deuterium) is referred to as $^2H$.

The inclusion of different isotopes in a material changes its density, but not its chemical, mechanical, or electrical properties. For instance, water molecules contain two hydrogen atoms and one oxygen atom. Water made with regular hydrogen has density of about 1000 kg/m3. Water made with two deuterium atoms per molecule has density of about 1111 kg/m3, but is chemically indistinguishable from regular water. Normally, materials used in engineering contain the natural abundance of each isotope. For another example, iron has four relatively common isotopes: $^{54}Fe$ (5.85%), $^{56}Fe$ (91.75%), $^{57}Fe$ (2.12%), and $^{58}Fe$ (0.28%). Iron used in ordinary engineering applications (e.g. 18/8 stainless steel), therefore contains these four isotopes in the abundances listed.

It is possible to isotopically enrich any element that has more than one isotope. Several processes are known for producing materials with different isotopic abundances than the abundances found in nature (i.e. naturally occurring abundance). Enrichment is the handling of a material in such a way that the abundance of some isotopes increases and the abundance of other isotope(s) decreases. Enrichment processes usually exploit the difference in mass of the isotopes of a given element to separate the isotopes from each other. For example, gaseous diffusion enrichment relies on the fact that gaseous atoms of lighter isotopes move slightly faster than atoms of a heavier isotope. The lighter isotope therefore gets through a filter slightly faster than the heavier isotope. Over many filter cycles, it is possible to produce a material that is highly enriched in one, or more, of the light isotopes and depleted in the heavier isotopes. Other exemplary enrichment processes use gas centrifuges, magnetic centrifugation with ionized atoms, liquid diffusion, atomic laser isotope separation, molecular laser isotope separation, and laser pulse-dynamic isotope separation. Which enrichment process to use depends on the mass of the isotopes involved and on the chemical properties of the element.

Isotopic enrichment is used to produce fuel for nuclear weapons and nuclear reactors, to produce heavy water for nuclear research, to produce ultra-uniform crystal matrices and purified materials for physics experiments, and to produce isotopic tracer materials for use in science and medicine. However, these uses fail to give rise to a consideration of the need to maintain the mechanical, chemical, or electrical properties of the un-enriched element in the enriched product. For instance, fuel for nuclear applications need not be mechanically, chemically, or electrically similar to the naturally occurring uranium (or other nuclear fuel). Rather, the peculiar uses of nuclear fuel dictate that the nuclear properties (e.g. thermal neutron cross-section) predominate over all other considerations. A byproduct of the uranium enrichment, depleted uranium is used to manufacture armor piercing bullets. However, again the mechanical, chemical, and electrical properties of the un-enriched uranium are irrelevant to the suitability of the depleted uranium bullet for its intended use. In fact the bullet is destroyed upon use. As with nuclear fuel, the use of the heavy water, the ultra-uniform crystals, and the pure materials (for physics research), dictates that properties of the isotope that are related to physics (e.g. neutron absorption, x-ray scattering, or spectral properties) predominate over all other considerations. Similarly, it is the radioactive properties of each isotope that make them useful for tracing applications. The mechanical and chemical properties of the isotope involved are essentially irrelevant in these applications because the system designer will accommodate the (mechanical, chemical, and electrical) properties of the enriched isotope as these properties are found. In all of these applications, it is the difference between isotopes that is telling, not the similarities.

While isotopic enrichment is commonly considered to be very expensive, the high cost is largely due to the high degree of enrichment needed for these particular end products. The cost of modest enrichment is much lower. Thus, producing water where 99% of the hydrogen atoms are deuterium is thousands of times more costly than producing water where 1% of the hydrogen is deuterium. Another reason enrichment is considered to be expensive is that the cost of enrichment tends to increase with increasing average atomic weight of an element. Since one of the more commonly known enrichment processes involves the natural element with the highest atomic weight (uranium, atomic weight of 238.02) it is perhaps easy to understand why this misconception arose. Relatively low-cost, versatile isotope enrichment is indeed available from institutions in the former Soviet Union among others. For example, a National Science Foundation (NSF)

project has contracted with the Zelenogorsk Electrochemical Plant in Krasnoyarsky, Russia, to produce 500 kg of 85% pure $^{76}$Ge. This is more than a ten-fold enrichment over the natural $^{76}$Ge abundance of 7.61%. The Russian group planned to charge $56,000 per kilogram for this service. For larger volumes of material, they would presumably charge a lower rate. An NSF document on this proposed contract noted that the Russian group had already established a track record of providing high-grade enriched isotopes on schedule and on budget. Additionally, domestic sources of enriched materials are available. Moreover, because some existing enrichment processes may enrich the product with a heavy isotope, rather than a light isotope, it may be possible to obtain the tailings from these enrichment processes and use the tailings as the isotopically enriched element for the methods, materials, and components provided by the present invention.

According to a preferred embodiment of the present invention, many elements used in spacecraft components are enriched with lighter isotopes, thereby causing a beneficial reduction in the density of the components. More particularly, elements that 1.) have a large relative variance in their isotopic mass and
2.) have enough of both light and heavy isotopes that changing the concentration of the isotopes in favor of the light isotopes causes a useful reduction in density are isotopically enriched with lighter isotopes for use as material used to fabricate components of spacecraft. Of course, the present invention is not limited to just those cases in which the change can be made economically because, in some applications, the benefits of a mass reduction may be of greater moment than mere economic considerations. For instance, isotopic lightening may make some missions possible.

An exemplary element that can have its isotopic concentrations modified to reduce the mass of a component is lithium. Lithium has two stable isotopes, $^6$Li (with a natural abundance of 7.59%) and $^7$Li (92.41%). If naturally occurring lithium is enriched with $^6$Li by a factor of ten, then the concentration of $^6$Li increases to 75.9% and the mass decreases by 9.9% compared to natural lithium. Enriching $^6$Li and depleting $^7$Li can be readily accomplished using many of the available diffusion processes because the two isotopes differ in mass by a substantial ratio: (7−6)/6=1.1667. Relatively few filter cycles are therefore needed to achieve the exemplary order of magnitude enrichment. Since the lighter $^6$Li isotope has a natural abundance of several percent, an order-of-magnitude enrichment achieves good reduction in mass. Even a relatively modest enrichment by a factor of two reduces the mass of lithium by 1.1%.

The importance of the achievable mass reduction provided by the present invention can be illustrated with reference to the external tank (ET) of the Space Shuttle. The ET is fabricated from an (un-enriched) aluminum-lithium alloy known as Weldalite®, which is available from Pechiney Rolled Products of Ravenswood, W. Va. (owned by Alcan Inc. of Montreal, Canada). The alloy includes approximately 1% lithium, 4% copper, 0.4% silver, 0.4% magnesium, and 94.2% aluminum. A 10% reduction in the mass of lithium in the alloy is achievable at moderate levels of enrichment and causes an approximate mass reduction in the alloy of about 0.1%. For large structures such as the 30 ton Space Shuttle ET, the weight savings will be approximately 60 pounds per ET.

Based on the National Science Foundation (NSF) Germanium enrichment project with the Zelenogorsk Electrochemical Plant (see above), fabricating an ET from enriched lithium would reduce overall cost. Assuming that the lithium will be enriched to 85% $^6$Li, a comparison of enriching germanium and lithium reveals the following:

|  | Germanium | Lithium |
| --- | --- | --- |
| Low mass isotope atomic weight | 131 | 6 |
| High mass isotope atomic weight | 133 | 7 |
| Mass ratio between isotopes | 1.1053 | 1.1667 |
| Speed ratio | 1.0076 | 1.0801 |
| No. enrichment cycles | 592.16 | 58.2 |

Based on the difference in the number of enrichment cycles required for germanium and lithium and on the $56,000 per kilogram estimate for enriching germanium, the cost for enriching lithium should be approximately $540 per kilogram. With the mass of the lithium being reduced by about 11.2%, the cost for a 1 kilogram reduction in the mass of lithium is about $4800. Since launch costs are approximately $10,000 per kilogram the enrichment cost is more than offset. Moreover, as the example shows, the enrichment saves about $5200 per kilogram of reduced mass. Further, because the cost of enrichment increases exponentially with the desired amount of enrichment, an economic balance can be reached between the amount of enrichment and the launch weight of the component.

Several other elements that are particularly well suited for isotopic enrichment include boron, magnesium, titanium, and iron. More particularly, Boron has two isotopes $^{10}$B (19.9%) and $^{11}$B (80.1%). The lighter boron isotope has a relatively large natural abundance. Moderate enrichment can thus reduce the density of boron by five percent or more. Boron is used in many high-performance aerospace structures such as the boron-epoxy reinforced titanium tubes used in the thrust structure of the Space Shuttle Orbiter. Un-enriched boron fibers for use in fabricating these tubes are available from Specialty Materials, Inc. of Lowell, Mass. Since the tubes are approximately 75% (un-enriched) boron-epoxy, tubes made from boron enriched with $^{10}$B will be significantly lighter than tubes made from naturally occurring boron.

Likewise, magnesium has three isotopes: $^{24}$Mg (78.99%), $^{25}$Mg (10.0%), and $^{26}$Mg (11.01%). Depleting the two heavier isotopes by a factor of five is relatively easy and reduces the overall density by about one percent. Similarly, titanium has five isotopes: $^{46}$Ti (8.25%), $^{47}$Ti (7.44%) $^{48}$Ti (73.72%), $^{49}$Ti (5.41%), and $^{50}$Ti (5.18%). Enriching the two lighter titanium isotopes by a factor of three and depleting the two heavier isotopes by a factor of 2.5 is also relatively easy and reduces the overall density by about one percent. Iron has four isotopes of which two are rather common: $^{54}$Fe (5.845%) and $^{56}$Fe (91.754%). Enriching iron with $^{54}$Fe by a factor of ten reduces the overall density of the iron by about two percent.

Copper is also another good candidate for isotopic lightening. It has two isotopes: $^{63}$Cu (69.17%) and $^{65}$Cu (30.83%.) Enriching copper with $^{63}$Cu would lighten the copper by almost 1%. Because many electrical conductors are copper, and because much of the weight on a spacecraft is wiring, a significant weight savings can be realized by isotopically lightening copper. Moreover, enriching the aluminum-lithium alloy with lower weight copper would add to the weight savings of the Space Shuttle External Tank example discussed previously.

Heavier elements that are promising candidates for density reduction include molybdenum, cadmium, tin, samarium (used in electric motors and in some microwave amplifiers), and hafnium (used to make refractory alloys). Though many other modifiable elements exist of which chrome, silver, tungsten, lead, copper, zinc, and tantalum are yet a few more examples.

The aerospace market, in particular, offers many areas in which the principles of the present invention can be applied. By reducing the mass of non-payload components more customer payload mass can be launched on the same vehicle. For instance, the mass of the Delta IV and SeaLaunch launch vehicles (available from The Boeing Co. of Chicago, Ill.) can be significantly reduced by isotopic lightening. Because delivering payloads to orbit is the principal role of these products, more mass delivered per launch makes these vehicles more valuable to the payload customers. Likewise satellites, both military and commercial, can benefit from isotopic lightening of the launch vehicle mass, or even isotopic lightening of the satellites themselves. Thus, the owners of the satellites do not have to pay to launch as much mass that does not contribute to the commercial success of the satellites (e.g. components for which the peak loads occur during launch and are therefore designed for those loads). More mass may therefore be allocated to the commercially valuable components of the payload (e.g. antennas, transponders, and imaging apparatus).

Reusable launch vehicles, or space planes, represent other applications where the principles of the present invention can yield significant benefits. For instance, the Boeing Co. has ongoing studies of reusable launch vehicles and has a current project to develop a reusable space plane (or space maneuvering vehicle) for the United States Air Force. Each reduction of a kilogram on the vehicle allows an additional kilogram of payload on every mission the vehicle flies. Thus, the value of reduced vehicle mass is multiplied by the number of missions the vehicle will fly. A similar proposition applies to modifications to the Space Shuttle. Moreover, because modifications to the Shuttle are likely in the wake of the Columbia incident, relatively near term benefits may accrue to the nation if the principles of the present invention are applied to these (and other) Shuttle modifications. As with any reusable vehicle, mass reduction on the Space Shuttle Orbiter will pay for itself many times over by allowing more payload mass on each of many flights.

Another exemplary vehicle for mass reduction is the upcoming NASA Mars Sample Return mission. The sample return canister will go through a total velocity increment of at least 17 km/sec (and probably considerably more) using chemical propulsion. Because the mission will cost well over a billion dollars and every gram of canister mass costs a gram of sample return capacity, the value of reduced mass in the canister (and its booster stage) is likely to justify a high degree of mass reduction via isotopic enrichment.

In fact, a vehicle soft-landed on Mars, and then returned to Earth, helps illustrate an important benefit that applies particularly to the upper most stages of a launch vehicle. Every kilogram of mass returned to Earth (on the return canister) must be lifted from Earth, out of low Earth orbit, to Mars, set down safely on the surface of Mars, and then returned to Earth. Each of these operations requires an expenditure of energy in the form of propellant used. Because the mass of propellant that is used to return the spacecraft to Earth must be lifted from Earth and then from Mars, any mass reduction in the vehicle for the last stage of the mission will prove particularly valuable. Though, mass reductions in earlier stages will also be valuable in reducing the propellant required for earlier (i.e. lower) stages. Even mass reductions in the first stage of a vehicle are valuable because it is during first stage operation that the vehicle is at its heaviest and requires the greatest force to accelerate.

Figure 2:
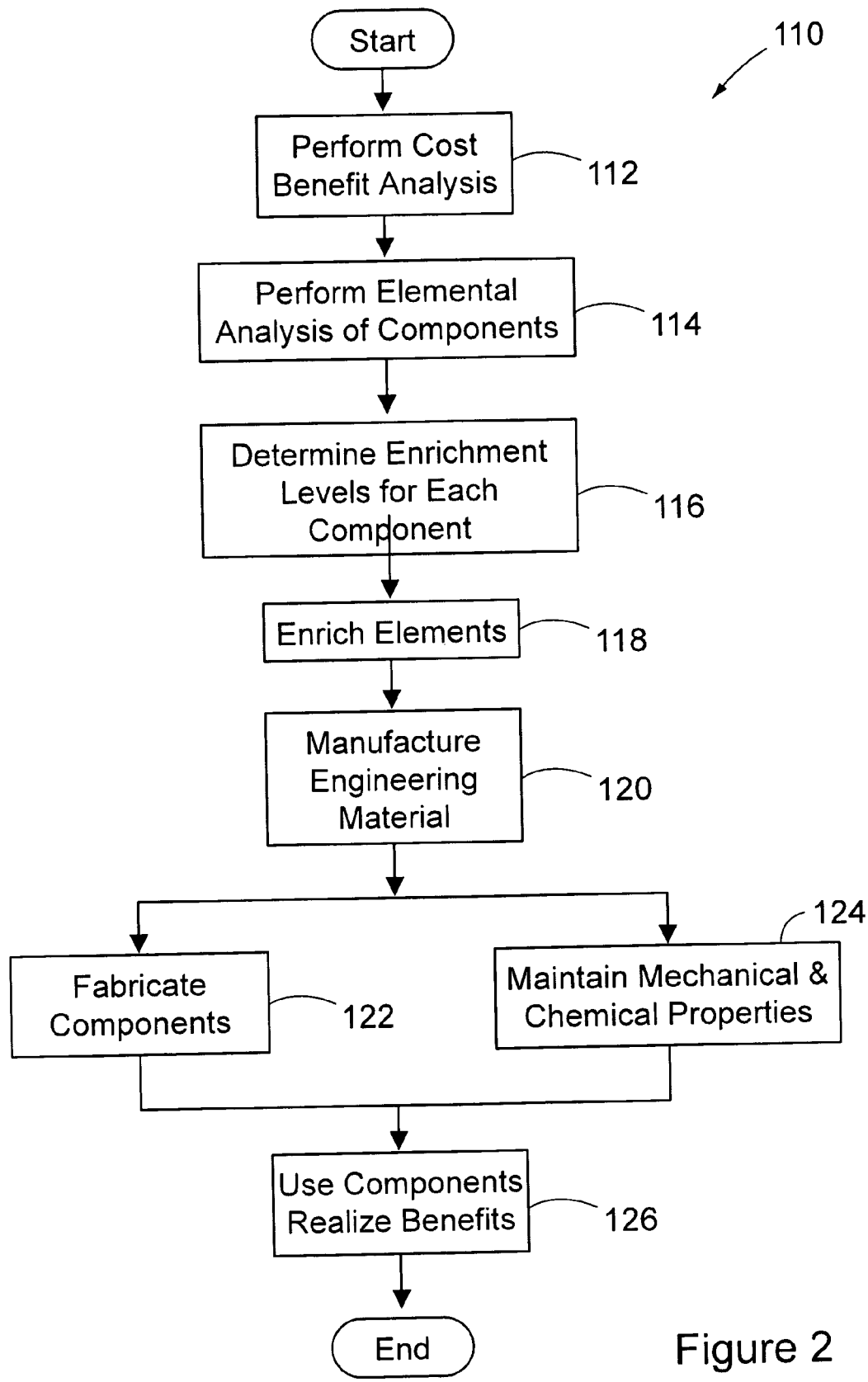
FIG. 2 illustrates a method in accordance with a preferred embodiment of the present invention.

Turning now to FIG. 2, in another preferred embodiment, a method is illustrated of developing a spacecraft (or other structure) for which it is desired to provide structural components having relatively high strength-to-weight ratios. Of course, chemical and electrical properties can also be considerations in the current embodiment. The method 110 includes assessing the benefits associated with an incremental reduction in the weight of the components. See operation 112. The assessment involves several considerations. First, a reduction of the mass of a stage of a vehicle allows for additional structure, equipment, or payload on that same stage of the vehicle. For example, if a satellite design is lightened by 1 kilogram, an additional kilogram "worth" of valuable capability (e.g. another transponder) can be added to the satellite without affecting the mass allocation of the overall launch vehicle. Second, the mass reduction can instead be used to lessen the design requirements of lower stages of the launch vehicle. Thus, a one kilogram reduction in the mass of a payload (or stage) lessens the propellant required onboard every stage required to lift the payload to its desired location (e.g. geosynchronous orbit). Thus, the launch vehicle and geosynchronous transfer upper stage may be smaller (and therefore less expensive) than would otherwise be required. Third, a mass reduction of a lower stage increases the allowable weight of upper stages including the payload itself.

The mass reduction can therefore be assessed in terms of a cost/benefit analysis, particularly "at the margin" where incremental changes may be quite valuable. Of course, economies of scale in the enrichment process may make even relatively large mass reductions economical rather than mere incremental reductions. Each application may be studied with appropriate trade-offs made as suggested by the objectives of a given mission. The net result of the study(s) will usually be a mix of benefits (e.g. a smaller, less expensive launch vehicle is selected, a payload is augmented with additional equipment or capability, or some economic benefit is realized). Though, of course, one benefit can be emphasized to the exclusion of the other benefits.

Components of the vehicle can then be identified as candidates for mass reduction by isotopic lightening in operation 114. A selection of those components (and enrichment levels of the elements thereof) that can yield the desired overall mass reduction can be made by trade study, or otherwise. See operation 116. At an appropriate time, the desired amount of each element is enriched as in operation 118. It is worth noting at this juncture, that a given project can identify the entire amount of an element that is to be used for the project. If the entire amount of the element desired for the project is enriched at once, the project can realize economies of scale that would not be available to each component manufacturer acting independently. In the alternative, materials suppliers can create stocks of isotopically lightened materials designated for use in appropriate applications (including, but not limited to, aerospace applications).

The enriched elements are then used as feedstock to create the materials for the various components. For instance if a component that is to be fabricated from an aluminum-lithium alloy is to be isotopically lightened, the enriched lithium is alloyed with the aluminum. See operation 120. Thereafter, the components are fabricated from the enriched material while (because of the nature of isotopes) the mechanical, chemical, and electrical properties of the materials remain unchanged from that of the un-enriched material as in operations 122 and 124. Thus, the method of the current embodiment yields components having the original strength, lower mass, accordingly higher strength-to-weight (mass) ratios, as well as the original chemical properties of the un-enriched component.

Likewise, because the enrichment of a material with a lighter isotope will not affect the electrical properties of the material, the isotopically lightened materials provided herein will enjoy the same electrical properties as the un-enriched material. Accordingly, the isotopically lightened materials may be used as conductors, resistors, and the like without departing from the scope of the present invention. At some time, the components fabricated with the isotopically enriched element(s) are placed in use and the benefits of the isotopically reduced mass are realized. See operation 126.

The invention provides materials with reduced mass and the same material strength, stiffness, and other desired mechanical (and chemical and electrical) properties as the un-enriched, naturally occurring material. Further, the present invention provides these advantages without reducing the safety margin of components and without requiring that the new materials be developed and qualified. In contrast, other approaches to mass reduction require material substitution, reduced margins, or re-qualification. Even when re-qualification is implemented by additional engineering analysis (as opposed to additional testing and demonstrations), additional expenses are incurred because of the degree of rigor required to avoid the re-qualification testing.

Moreover, the degree of mass reduction can be traded off against the benefits accruing from the mass reduction. When mass reduction is only moderately beneficial, a modest amount of isotopic enrichment can be used. When mass reduction is extremely beneficial, more profound isotopic enrichment can be used. Plus, the degree of mass reduction can be tailored to the application with little or no design change. Further, the same design for the component can be used with zero, some, or a large degree of isotopic enrichment depending on the requirements for low mass associated with the particular use of the component (e.g. a particular Shuttle external tank can be lightened considerably more than other external tanks to accommodate a particularly heavy payload). Thus, it is believed that the present invention is the only approach that provides a way to trade-off mass and cost for a given application without necessitating costly design changes.

Isotopic lightening can also be used in a variety of other beneficial ways. For instance, the density of a solvent can be modified to more closely match the density of a solute. With the density of the two components being closer than they otherwise would be, convection due to concentration gradients is reduced. An example of density matching through isotopic enhancement is altering the density of water (whether the enrichment is with the heavier $^2$H or lighter $^1$H isotope) to match that of a protein, thereby beneficially reducing convection during formation of protein crystals. For another example of a beneficial use of isotopic density modification, is in the preparation of an alloy or other mixture. If two of the materials are barely miscible, altering the density of one of the materials (or both) might improve the mixing of the materials and improve the mixture accordingly. Similar improvements for composite materials may also be possible if the density of the fibers and the matrix are modified to better match.

Various modifications could be made in the constructions and methods described without departing from the scope of the invention. All matter contained in the description or shown in the accompanying drawings shall be interpreted as illustrative rather than limiting. For example, while the invention has been described in the context of launch vehicles, the structures to which the principles of the present invention may be applied are not so limited. For instance, aircraft and land and marine vehicles may benefit from application of the principles of the present invention. Further, any structure for which a reduced mass is desirable may benefit from the principles of the present invention. Thus, the breadth and scope of the present invention should not be limited by any exemplary embodiment, but should be defined only in accordance with the following claims and their equivalents.

What is claimed is:

1. An article of manufacture comprising:
   a portion of an element;
   a first isotope of the element; and
   a second isotope of the element having a property that is the same as a property of the first isotope, the first and the second isotopes each having a natural abundance in the element and an atomic weight, the atomic weight of the first isotope being less than the atomic weight of the second isotope, the portion of the element being enriched with the first isotope, the property being one of a mechanical, a chemical, and an electrical property.

2. The article of claim 1 being an aluminum-lithium alloy enriched in at least one light isotope of lithium over the natural abundance.

3. The article according to claim 1, wherein the first isotope is radioactively stable.

4. The article according to claim 1, further comprising the portion of the element being enriched with a third isotope of the element.

5. The article according to claim 1, wherein the article is adapted for use on a spacecraft.

6. The article according to claim 1, wherein the element is at least one of hydrogen, lithium, boron, magnesium, titanium, or iron.

7. The article according to claim 1, wherein the article is made of an alloy.

8. The article according to claim 1, wherein the article is made of a composite material.

9. A light-weight component, comprising:
   a portion of an element in a metal alloy;
   a first isotope of the element; and
   a second isotope of the element having a property that is the same as a property of the first isotope that is one of a mechanical, a chemical, and an electrical property, the first and the second isotopes each having a natural abundance in the element and an atomic weight, the atomic weight of the first isotope being less than the atomic weight of the second isotope, the portion of the element being enriched with the first isotope.

10. A mixture, comprising:
    a first portion of a first element;
    a first isotope of the first element;
    a second isotope of the first element having a property that is the same as a property of the first isotope, the property being one of a mechanical, a chemical, and an electrical property, the first and the second isotopes each having a natural abundance in the first element and an atomic weight, the atomic weight of the first isotope being less than the atomic weight of the second isotope, the first portion of the first element being enriched with the first isotope;
    and a second portion of a second element, the first portion of the first element and the second portion of the second element being mixed.

11. The mixture according to claim 10, wherein the mixture is an alloy.

12. An vehicle comprising:
    a portion of an element;
    a first isotope of the element;

a second isotope of the element having a property that is the same as a property of the first isotope, the property being one of a mechanical, a chemical, and an electrical property, the first and the second isotopes each having a natural abundance in the element and an atomic weight, the atomic weight of the first isotope being less than the atomic weight of the second isotope, the portion of the element being enriched with the first isotope; and at least one component made from the enriched element.

13. The vehicle according to claim 12, wherein the vehicle is one of an aircraft, a launch vehicle, or a spacecraft.

14. The vehicle according to claim 12, wherein the component moves relative to another component on the vehicle.

15. The vehicle according to claim 12, further comprising:

a second portion of a second element;

wherein the portion of the element and the second portion of the second element being mixed.

16. The mixture according to claim 15, wherein the mixture is an alloy.

* * * * *